US008669327B2

(12) United States Patent
Minowa et al.

(10) Patent No.: US 8,669,327 B2
(45) Date of Patent: Mar. 11, 2014

(54) CROSS-LINKED POLYOLEFIN COMPOSITION

(75) Inventors: Kazuhiko Minowa, Kawasaki (JP);
Yukihiro Hisanaga, Kawasaki (JP);
Paolo Goberti, Vigarano Mainarda (IT);
Giampaolo Pellegatti, Boara (IT)

(73) Assignee: Basell Poliolefine Italia S.r.l., Milano (IT)

( * ) Notice: Subject to any disclaimer, the term of this patent is extended or adjusted under 35 U.S.C. 154(b) by 0 days.

(21) Appl. No.: 13/806,682

(22) PCT Filed: Jun. 23, 2011

(86) PCT No.: PCT/EP2011/060562
§ 371 (c)(1),
(2), (4) Date: Dec. 21, 2012

(87) PCT Pub. No.: WO2012/000884
PCT Pub. Date: Jan. 5, 2012

(65) Prior Publication Data
US 2013/0102735 A1    Apr. 25, 2013

Related U.S. Application Data

(60) Provisional application No. 61/401,039, filed on Aug. 6, 2010.

(30) Foreign Application Priority Data

Jun. 30, 2010 (EP) ..................... 10167865

(51) Int. Cl.
*C08F 8/00* (2006.01)
(52) U.S. Cl.
USPC ............ 525/191; 525/240; 524/515; 524/529
(58) Field of Classification Search
USPC ..................... 525/191, 240; 524/515, 529
See application file for complete search history.

(56) References Cited

U.S. PATENT DOCUMENTS

| 5,143,978 | A | 9/1992 | Berta |
| 5,552,482 | A | 9/1996 | Berta |
| 8,008,401 | B2 * | 8/2011 | Ito et al. ........... 525/191 |
| 2011/0190450 | A1 * | 8/2011 | De Palo et al. ......... 525/240 |
| 2012/0264883 | A1 * | 10/2012 | Pellegatti et al. ......... 525/240 |

FOREIGN PATENT DOCUMENTS

| EP | 0633289 | 1/1995 |
| EP | 1279699 | 1/2003 |
| WO | WO-98/37144 | 8/1998 |
| WO | WO-2006/042815 | 4/2006 |
| WO | WO-2007042375 | 4/2007 |
| WO | W0-2009/000637 | 12/2008 |
| WO | WO-2010034684 | 4/2010 |
| WO | WO-2012000885 | 1/2012 |

OTHER PUBLICATIONS

Chujo, R et al., "Two-site model analysis of 13C n.m.r. of polypropylene polmerized by . . . ", Polymer, vol. 35, No. 2 1994, 339.
Asakura, et al., "Carbon-13 NMR Spectral Assignment . . . ", Macromolecules 1991, 24 1991, 2334-2340.
Randall, J., "A Review of High Resolution Liquid (13) Carbon Nuclear Magnetic Resonance Characterizations of Ethylene-Based Polymers", JMS—Rev. Macromol. Chem. Phys. C29 (2&3) 1989, 201-317.
Cheng, H. N. et al., "13C NMR Analysis of Propylene-Butylene Copolymers by a Reaction Probability Model", Journal of Polymer Science, vol. 21. 1983, 573-581.
Kakugo, Masahiro et al., "C NMR Determination of Monomer Sequence Distribution in Ethylene-Propylene copolymers prepared . . . ", Macromolecules, vol. 15, No. 4, 1982, 1150-1152.
Carman, C.J. et al., Macromolecules, 10, 3, 536 1977.

* cited by examiner

*Primary Examiner* — Nathan M Nutter

(57) ABSTRACT

A cross-linked composition obtained by cross-linking a polyolefin composition (I) comprising, all percentages being by weight:
A) from 5 to 38% of a polypropylene;
B) from 35 to 85% of a copolymer of ethylene with propylene, containing from 42 to 70% of ethylene and having solubility in xylene at room temperature greater than 50%;
C) from 5 to 40% of a butene-1 homopolymer or copolymer having:
   a content of butene-1 derived units of 75% or more;
   a flexural modulus of 100 MPa or less; and optionally,
D) from 5 to 35% of one or more polymers different from B) in composition, having a Shore A hardness value equal to or lower than 90 points, wherein the content of butene-1, if present, is of less than 50%;
in which composition (I) the amounts of A), B), C) and D) are referred to the total weight of A)+B)+C) and optionally D), and when D) is present, the total weight of C)+D) is of 50% or less, referred to the total weight of A)+B)+C)+D).

11 Claims, No Drawings

CROSS-LINKED POLYOLEFIN COMPOSITION

This application is the U.S. national phase of International Application PCT/EP2011/060562, filed Jun. 23, 2011, claiming priority to European Patent Application 10167865.4 filed Jun. 30, 2010, and the benefit under 35 U.S.C. 119(e) of U.S. Provisional Application No. 61/401,039, filed Aug. 6, 2010; the disclosures of International Application PCT/EP2011/060562, European Patent Application 10167865.4 and U.S. Provisional Application No. 61/401,039, each as filed, are incorporated herein by reference.

The present invention relates to a cross-linked thermoplastic and elastomeric polyolefin composition having low hardness and reduced compression set and to the process for its preparation.

By virtue of its low hardness and very good rheological properties, said composition is especially useful for applications wherein softness and capability to be easily formed even into articles of reduced thickness is desired, like for the production of wire and cable sheaths, auto interior skins, synthetic leather and extruded profiles.

Some cross-linked polyolefin compositions of the soft type are already described in U.S. Pat. No. 5,143,978.

These compositions are obtained by cross-linking, in the presence of free radical initiators like organic peroxides, compositions containing a propylene homopolymer or copolymer, an elastomeric olefin copolymer and a crystalline, highly isotactic polymer of butene-1.

However the hardness of said known compositions is still too high, namely around 88-89 Shore A points.

Moreover, paraffin oil is used to improve the rheological properties of the compositions. One problem presented by such known technical solution is that the so obtained compositions are somewhat tacky, due to surface migration of the paraffin oil, and said tackiness reveals itself in time.

It has now surprisingly been found that it is possible to obtain polyolefin compositions having low hardness and very good rheological properties, even in the absence of plasticizers like paraffin oils, by cross-linking a composition containing a specific butene-1 (co)polymer.

Thus, the present invention provides a cross-linked composition obtained by cross-linking a polyolefin composition (I) comprising, all percentages being by weight:

A) from 5 to 38%, preferably from 8 to 30%, of a polypropylene component comprising a propylene homopolymer or a propylene copolymer with at least one α-olefin comonomer (different from propylene) or combinations thereof, said polypropylene component containing at least 85%, preferably at least 95%, of propylene and having a solubility in xylene at room temperature lower than 20%;

B) from 35 to 85%, preferably from 45 to 82%, of a copolymer of ethylene with propylene, containing from 42 to 70%, preferably from 45 to 65% more preferably from 50 to 65% of ethylene and having solubility in xylene at room temperature greater than 50%, preferably greater than 60%;

C) from 5 to 40%, preferably from 5 to 35%, of a butene-1 homopolymer or copolymer having:

a content of butene-1 derived units of 75% or more, preferably of 80% or more, more preferably of 84% or more, even more preferably of 90% or more;
  a flexural modulus of 100 MPa or less, preferably 60 MPa or less, more preferably 30 MPa or less; and optionally, D) from 5 to 35%, preferably from 5 to 30%, more preferably from 5 to 25%, of one or more polymers different from B) in composition (in terms of monomer amounts), having a Shore A hardness value equal to or lower than 90 points, wherein the content of butene-1, if present, is of less than 50%;

in which composition (I) the amounts of A), B), C) and D) are referred to the total weight of A)+B)+C) and optionally D), and when D) is present, the total weight of C)+D) is of 50% or less, referred to the total weight of A)+B)+C)+D).

Due to their highly favorable rheological properties, such compositions can be easily processed in the molten state, without requiring any processing aid.

The term "copolymer" as used herein refers to both polymers with two different recurring units and polymers with more than two different recurring units in the chain, such as terpolymers.

The polypropylene component (A) of the polyolefin composition (I) is typically (A1) a propylene homopolymer or (A2) a copolymer of propylene with at least one α-olefin of formula $H_2CH=CHR$, where R is H or a $C_{2-6}$ linear or branched alkyl.

Moreover, such component (A) is typically crystalline.

By "crystalline" is meant herein a polymer having high cristallinity, and consequently having a solubility in xylene at room temperature of lower than 20% by weight.

The homopolymer (A1) has a preferred solubility in xylene at room temperature lower than 10% by weight, more preferably lower than 5%, and even more preferably lower than 3%. By "room temperature" is meant herein a temperature of about 25° C.

The copolymer of propylene (A2) has a preferred solubility in xylene at room temperature lower than 15% by weight, more preferably lower than 10%, and even more preferably lower than 8%. Said α-olefin is preferably ethylene, butene-1, pentene-1, 4-methylpentene, hexene-1, octene-1 or any combinations thereof, and even more preferably the copolymer of propylene (A2) is a copolymer of propylene and ethylene.

Preferably, the polypropylene component (A) has a MFR (Melt Flow Rate) value from 5 to 70 g/10 min.

The copolymer (B) preferably has a value of intrinsic viscosity [η] of the fraction soluble in xylene at room temperature from 3.5 to 7 dl/g.

The polypropylene component (A) and the copolymer (B) of the polyolefin composition (I) can be prepared by separate polymerization processes or by sequential polymerisation in at least two stages. According to a preferred embodiment, a sequential polymerisation is carried out in the presence of a catalyst system comprising a trialkylaluminum compound, optionally an electron donor, and a solid catalyst component comprising a halide or halogen-alcoholate of Ti and an electron-donor compound supported on anhydrous magnesium chloride, as described for example in WO2007042375.

The component (C) is a butene-1 (co) polymer typically exhibiting from elastomeric to plastomeric behaviour and can be a homopolymer or a copolymer of butene-1 with one or more α-olefins (different from butene-1). Preferred as α-olefins, which may be present as comonomers in the component (C) of the composition of the invention, are those of formula $H_2CH=CHR$, where R is H or methyl or a $C_{3-6}$ linear or branched alkyl, in particular ethylene, propylene, pentene-1, hexene-1, 4-methylpentene and octene-1. Particularly preferred as comonomers are propylene and ethylene.

The Component (C) is preferably selected from the group consisting of:
- (C1) a butene-1 homopolymer or copolymer of butene-1 with at least another α-olefin, preferably with propylene as comonomer, having
    - percentage of isotactic pentads (mmmm %) from 25 to 55%, preferably from 35 to 55%;
    - intrinsic viscosity [η] measured in tetraline at 135° C. from 0.5 to 3 dL/g, preferably from 1 to 2.5 dL/g;
    - content of xylene insoluble fraction at 0° C. from 2 to 60 wt %, preferably from 3 to 20 wt %, more preferably less than 10 wt %;
- (C2) a butene-1 polymer, in particular a butene-1/ethylene copolymer or a butene-1/ethylene/propylene terpolymer having the following properties:
    - distribution of molecular weights (Mw/Mn) measured by GPC lower than 3.5, preferably lower than 3;
    - preferably no melting point (TmII) detectable at the DSC, measured according to the DSC method described herein below;

Typically, component (C) has a low crystallinity (less than 40% measured via X-ray, preferably less than 30%).

Preferably, component (C) has a density of 0.899 g/cm$^3$ or less, more preferably of 0.895 g/cm$^3$ or less.

The butene-1 (co)polymer (C2) can have a measurable melting enthalpy after aging. Particularly, measured after 10 days of aging at room temperature, the melting enthalpy of (C2) can be of less than 25 J/g, preferably of from 4 to 20 J/g.

The butene-1 (co)polymer (C1) can be prepared by polymerization of the monomers in the presence of a low stereospecificity Ziegler-Natta catalyst comprising (i) a solid component comprising a Ti compound and an internal electron-donor compound supported on $MgCl_2$; (ii) an alkylaluminum compound and, optionally, (iii) an external electron-donor compound. In a preferred aspect of the polymerization process, the external electron donor compound is not used in order not to increase the stereoregulating capability of the catalyst. In cases in which the external donor is used, its amount and modalities of use should be such as not to generate a too high amount of highly stereoregular polymer, such as described in the International application WO2006/042815 A1.

The butene-1 (co)polymer (C2) can be obtained by polymerizing the monomer(s) in the presence of a catalyst system obtainable by contacting:
- a stereorigid metallocene compound;
- an alumoxane or a compound capable of forming an alkyl metallocene cation; and, optionally,
- an organo aluminum compound.

Examples of the said catalyst system and of polymerization processes employing such catalyst system can be found in WO2009/000637.

In general, the polymerization process for the preparation of the butene-1 (co)polymer (C) can be carried out according to known techniques, for example slurry polymerization using as diluent a liquid inert hydrocarbon, or solution polymerization using for example the liquid butene-1 as a reaction medium. Moreover, it may also be possible to carry out the polymerization process in the gas-phase, operating in one or more fluidized or mechanically agitated bed reactors. The polymerization carried out in the liquid butene-1 as a reaction medium is preferred.

As a general rule, the polymerization temperature is generally comprised between −100° C. and +200° C., preferably from 20 to 120° C., more preferably from 40 to 90° C., most preferably from 50° C. to 80° C.

The polymerization pressure is generally comprised between 0.5 and 100 bar.

The polymerization can be carried out in one or more reactors that can work under same or different reaction conditions such as concentration of molecular weight regulator, comonomer concentration, external electron donor concentration, temperature, pressure etc.

Component (D) is typically elastomeric or plastomeric.

Component (D) is generally selected from olefin polymers, in particular copolymers containing more than 50% by weight of ethylene and at least one α-olefin comonomer (different from ethylene) and copolymers containing more than 50% by weight of propylene and at least one α-olefin comonomer (different from propylene).

Examples of α-olefin comonomers are those already given for components (A) and (C).

In particular, for the copolymers containing more than 50% by weight of ethylene, preferred comonomers are butene-1 and octene-1, while for the copolymers containing more than 50% by weight of propylene, preferred comonomers are ethylene and butene-1.

Preferably, component (D) is selected from the following copolymers, or their combinations:
- i) ethylene copolymers containing up to 45% by weight, in particular from 10 to 42% by weight, of at least one α-olefin comonomer (different from ethylene), preferably a $C_4$-$C_{10}$ α-olefin or a combination thereof;
- ii) propylene copolymers containing up to 40% by weight, preferably from 20 to 40% by weight, of at least one α-olefin comonomer (different from propylene), preferably ethylene or a $C_4$-$C_{10}$ α-olefin, or a combination thereof.

Examples of $C_4$-$C_{10}$ α-olefins that may be present as comonomers in copolymers i) and ii) are those of formula $H_2C$=CHR, where R is a $C_{2-8}$ linear or branched alkyl. Specific examples are butene-1, pentene-1, hexene-1,4-methylpentene and octene-1. Butene-1 and octene-1 are preferred for copolymer i), while ethylene and butene-1 are preferred for copolymer ii).

The said copolymers i) and ii) have typically a density from 0.850 to 0.890 g/cm$^3$, in particular from 0.855 to 0.885 g/cm$^3$.

Moreover, the said copolymers i) and ii) have typically Shore A hardness values equal to or lower than 80 points, preferably equal to or lower than 70 points.

A specific example of copolymers i) is Tafmer A-1050S®, made available on the market by Mitsui Chemicals.

Other suitable copolymers i) are the plastomers Exxact® and Engage®, made available on the market by ExxonMobil Chemical and Dow Chemical.

A specific example of copolymers ii) is Tafmer S4030®, made available on the market by Mitsui Chemicals.

Other suitable copolymers ii) are the plastomers Vistamaxx® and Versify®, made available on the market by ExxonMobil Chemical and Dow Chemical.

Preferred amounts of the said copolymers are from 20 to 80%, in particular from 30 to 70%, most preferably from 40 to 60% by weight of i) and from 20 to 80%, in particular from 30 to 70%, most preferably from 40 to 60% by weight of ii), said amounts being referred to the total weight of i) and ii).

The polyolefin composition (I) can be prepared according to conventional methods in known apparatuses, for example blending components A), B), C) and optionally D) or concentrates thereof in a Henschel or a Banbury mixer or in an extruder, in particular a twin-screw extruder, to uniformly disperse the said components, at a temperature equal to or higher than the polymer melt or softening temperature, followed by pelletizing.

An example of concentrate is the product of the previously explained sequential polymerization, comprising components A) and B).

Conventional additives, fillers and pigments, commonly used in olefin polymers, may be added, such as nucleating agents, extension oils, mineral fillers, and organic and inorganic pigments.

The cross-linked composition of the present invention is obtainable by blending the polyolefin composition (I) with a cross-linking additive and heating the thus obtained blend at a temperature above the melting temperature of component A), preferably at a temperature from 160 to 250° C.

The polyolefin composition (I) can also be prepared in the same apparatus used to carry out the cross-linking step, without going through pelletizing before cross-linking.

In fact the cross-linked polyolefin composition of the present invention is typically prepared by dynamic cross-linking. Said dynamic cross-linking consists of subjecting the above described polyolefin composition (I) to a blending process at a temperature higher than or equal to the polymer softening or melting point, in the presence of a cross-linking additive, which can be added before, during or after the first blending step, continuing said blending during the cross-linking step. Thus the whole process of preparing the polyolefin composition (I) and cross-linking it can be carried out in a single mixing apparatus, in particular in an extruder.

As previously said, it is typically operated at a temperature above the melting temperature of component (A), preferably at a temperature from 160 to 250° C.

Generally, any cross-linking additive known in the art can be used for the preparation of the cross-linked polyolefin composition of the present invention. In particular one can use cross-linking additives comprising organic peroxides, preferably having a half-life in the ethylene-propylene-diene rubbers (EPDM) ranging from 3.3 to 20 minutes, more preferably from 7 to 18 minutes at 160° C.

Specific examples of peroxides are: 1,1'-bis(tert-butylperoxy)diisopropylbenzene; dicumyl peroxide; n-butyl-4,4'-bis(tert-butylperoxy)valerate; 2,5-di(tert-butylperoxy)2,5-dimethylhexane, 2,5-dimethyl-2,5-di(t-butylperoxy)hexane. The peroxides are generally used in quantities ranging from 0.5 to 5, preferably from 1 to 3 parts by weight per 100 parts by weight of the polyolefin composition (I).

One or more cross-linking co-agents are generally used. Preferred examples of cross-linking co-agents are divinylbenzene, ethylvinylbenzene, triallyl cyanurate, tryallyl isocyanurate, 1,2-polybutadiene, acrylates, methacrylates and furan derivatives.

Specific examples of furan derivatives are 1,5-difurfuryl-1,4-pentadiene-3-one; beta (alpha-furyl)acrolein; 5-(alpha-furyl)pentadienal; alpha-furylacrylamide; alpha-furylacrylonitrile; beta-(alpha-furyl)acrylic acid and its esters; furfurylidene esters. Moreover, the cross-linking additive can contain further cross-linking co-agents, such as phenylene-bis-maleimide and/or sulfur donors, such as mercaptobenzothiazole, benzothiazyl disulfide, tetramethylthiuram monosulfide, tetramethylthiuram disulfide, dipentamethylenethiuram hexasulfide, N,N'-diethylthiourea, amylphenol disulfide, zinc dibutyldithiocarbamate. The cross-linking co-agents are added in quantities generally ranging from 0.5 to 5 parts by weight per 100 parts by weight of the polyolefin composition (I).

The particulars are given in the following examples, which are given to illustrate, without limiting, the present invention.

The following standard procedures are used for testing the properties defined in the examples and in the general description.

MFR: ISO 1133 with a load of 2.16 kg at 230° C. (except where different temperature and load are specified);
Intrinsic viscosity: determined in tetrahydronaphthalene at 135° C. (ASTM D 2857);
Density: ISO 1183;
Compression set at 75° C.: ASTM D 395 method B;
Hardness (Shore A): ISO 868;
Strand surface quality: the surface quality is considered visually as existence of melt fracture on strand surface. Strand surface quality "good" and "excellent" indicate that no melt fracture is evident and the strand surface is smooth or very smooth.
Comonomer Contents:
determined by IR spectroscopy or by NMR (when specified). Particularly for the butene-1 copolymers component (C) the amount of comonomers was calculated from $^{13}$C-NMR spectra of the copolymers of the examples. Measurements were performed on a polymer solution (8-12 wt %) in dideuterated 1,1,2,2-tetrachloro-ethane at 120° C. The $^{13}$C NMR spectra were acquired on a Bruker AV-600 spectrometer operating at 150.91 MHz in the Fourier transform mode at 120° C. using a 90° pulse, 15 seconds of delay between pulses and CPD (WALTZ16) to remove $^1$H—$^{13}$C coupling. About 1500 transients were stored in 32K data points using a spectral window of 60 ppm (0-60 ppm).
Copolymer Composition
Diad distribution is calculated from $^{13}$C NMR spectra using the following relations:
PP=100 $I_1/\Sigma$
PB=100 $I_2/\Sigma$
BB=100 $(I_3-I_{19})/\Sigma$
PE=100 $(I_5+I_6)/\Sigma$
BE=100 $(I_9+I_{10})/\Sigma$
EE=100 $(0.5(I_{15}+I_6+I_{10})+0.25(I_{14}))/\Sigma$
Where $\Sigma=I_1+I_2+I_3-I_{19}+I_5+I_6+I_9+I_{10}+0.5(I_{15}+I_6+I_{10})+0.25(I_{14})$
The molar content is obtained from diads using the following relations:
P (m %)=PP+0.5 (PE+PB)
B (m %)=BB+0.5 (BE+PB)
E (m %)=EE+0.5 (PE+BE)
$I_1, I_2, I_3, I_5, I_6, I_9, I_6, I_{10}, I_{14}, I_{15}, I_{19}$ are integrals of the peaks in the $^{13}$C NMR spectrum (peak of EEE sequence at 29.9 ppm as reference). The assignments of these peaks are made according to J. C. Randal, *Macromol. Chem Phys.*, C29, 201 (1989), M. Kakugo, Y. Naito, K. Mizunuma and T. Miyatake, *Macromolecules*, 15, 1150, (1982), and H. N. Cheng, *Journal of Polymer Science, Polymer Physics Edition*, 21, 57 (1983). They are collected in Table A (nomenclature according to C. J. Carman, R. A. Harrington and C. E. Wilkes, *Macromolecules*, 10, 536 (1977)).

TABLE A

| I | Chemical Shift (ppm) | Carbon | Sequence |
|---|---|---|---|
| 1 | 47.34-45.60 | $S_{\alpha\alpha}$ | PP |
| 2 | 44.07-42.15 | $S_{\alpha\alpha}$ | PB |
| 3 | 40.10-39.12 | $S_{\alpha\alpha}$ | BB |
| 4 | 39.59 | $T_{\delta\delta}$ | EBE |
| 5 | 38.66-37.66 | $S_{\alpha\gamma}$ | PEP |
| 6 | 37.66-37.32 | $S_{\alpha\delta}$ | PEE |
| 7 | 37.24 | $T_{\beta\delta}$ | BBE |
| 8 | 35.22-34.85 | $T_{\beta\beta}$ | XBX |
| 9 | 34.85-34.49 | $S_{\alpha\gamma}$ | BBE |
| 10 | 34.49-34.00 | $S_{\alpha\delta}$ | BEE |
| 11 | 33.17 | $T_{\delta\delta}$ | EPE |
| 12 | 30.91-30.82 | $T_{\beta\delta}$ | XPE |

TABLE A-continued

| I | Chemical Shift (ppm) | Carbon | Sequence |
|---|---|---|---|
| 13 | 30.78-30.62 | $S_{\gamma\gamma}$ | XEEX |
| 14 | 30.52-30.14 | $S_{\gamma\delta}$ | XEEE |
| 15 | 29.87 | $S_{\delta\delta}$ | EEE |
| 16 | 28.76 | $T_{\beta\beta}$ | XPX |
| 17 | 28.28-27.54 | $2B_2$ | XBX |
| 18 | 27.54-26.81 | $S_{\beta\delta} + 2B_2$ | BE, PE, BBE |
| 19 | 26.67 | $2B_2$ | EBE |
| 20 | 24.64-24.14 | $S_{\beta\beta}$ | XEX |
| 21 | 21.80-19.50 | $CH_3$ | P |
| 22 | 11.01-10.79 | $CH_3$ | B |

Fractions soluble and insoluble in xylene at 25° C. (XS 25° C.): 2.5 g of polymer are dissolved in 250 mL of xylene at 135° C. under agitation. After 20 minutes the solution is allowed to cool to 25° C., still under agitation, and then allowed to settle for 30 minutes.

The precipitate is filtered with filter paper, the solution evaporated in nitrogen flow, and the residue dried under vacuum at 80° C. until constant weight is reached. Thus one calculates the percent by weight of polymer soluble (Xylene Solubles—XS) and insoluble at room temperature (25° C.).

The percent by weight of polymer insoluble in xylene at ambient temperature is considered the isotactic index of the polymer. This value corresponds substantially to the isotactic index determined by extraction with boiling n-heptane, which by definition constitutes the isotactic index of polypropylene.

Fractions Soluble and Insoluble in Xylene at 0° C. (XS 0° C.): 2.5 g of the butene-1 (co)polymers (component (C)) are dissolved in 250 ml of xylene at 135° C. under agitation. After 30 minutes the solution is allowed to cool to 100° C., still under agitation, and then placed in a water and ice bath to cool down to 0° C. Then, the solution is allowed to settle for 1 hour in the water and ice bath. The precipitate is filtered with filter paper. During the filtering, the flask is left in the water and ice bath so as to keep the flask inner temperature as near to 0° C. as possible. Once the filtering is finished, the filtrate temperature is balanced at 25° C., dipping the volumetric flask in a water-flowing bath for about 30 minutes and then, divided in two 50 ml aliquots. The solution aliquots are evaporated in nitrogen flow, and the residue dried under vacuum at 80° C. until constant weight is reached. The weight difference in between the two residues must be lower than 3%; otherwise the test has to be repeated. Thus, one calculates the percent by weight of polymer soluble (Xylene Solubles at 0° C.=XS 0° C.) from the average weight of the residues. The insoluble fraction in o-xylene at 0° C. (xylene Insolubles at 0° C.=XI % 0° C.) is: XI % 0° C.=100–XS % 0° C.

Determination of X-ray Crystallinity

The X-ray crystallinity was measured with an X-ray Diffraction Powder Diffractometer using the Cu—Kα1 radiation with fixed slits and collecting spectra between diffraction angle 2Θ=5° and 2Θ=35° with step of 0.1° every 6 seconds.

Measurements were performed on compression molded specimens in the form of disks of about 1.5-2.5 mm of thickness and 2.5-4.0 cm of diameter. These specimens are obtained in a compression molding press at a temperature of 200° C.±5° C. without any appreciable applied pressure for 10 minutes. Then applying a pressure of about 10 Kg/cm² for about few second and repeating this last operation for 3 times.

The diffraction pattern was used to derive all the components necessary for the degree of cristallinity by defining a suitable linear baseline for the whole spectrum and calculating the total area (Ta), expressed in counts/sec·2Θ, between the spectrum profile and the baseline.

Then a suitable amorphous profile was defined, along the whole spectrum, that separate, according to the two phase model, the amorphous regions from the crystalline ones. Thus it is possible to calculate the amorphous area (Aa), expressed in counts/sec·2Θ, as the area between the amorphous profile and the baseline; and the cristalline area (Ca), expressed in counts/sec·2Θ, as Ca=Ta−Aa The degree of cristallinity of the sample was then calculated according to the formula:

$$\% Cr = 100 \times Ca/Ta$$

The thermal properties (melting temperatures and entalpies) were determined by Differential Scanning calorimetry (D.S.C.) on a Perkin Elmer DSC-7 instrument. The melting temperatures of butene-1 homo and co-polymers were determined according to the following method:

TmII (measured in second heating run): A weighted sample (5-10 mg) obtained from the polymerization was sealed into aluminum pans and heated at 200° C. with a scanning speed corresponding to 20° C./minute. The sample was kept at 200° C. for 5 minutes to allow a complete melting of all the crystallites. Successively, after cooling to −20° C. with a scanning speed corresponding to 10° C./minute, the peak temperature was taken as crystallization temperature (Tc). After standing 5 minutes at −20° C., the sample was heated for the second time at 200° C. with a scanning speed corresponding to 10° C./min. In this second heating run, the peak temperature was taken as the melting temperature of the PB-1 crystalline form II (TmII) and the area as global melting enthalpy (ΔHfII).

The melting enthalpy after 10 days was measured as follows by using the Differential Scanning calorimetry (D.S.C.) on an Perkin Elmer DSC-7 instrument: A weighted sample (5-10 mg) obtained from the polymerization was sealed into aluminum pans and heated at 200° C. with a scanning speed corresponding to 20° C./minute. The sample was kept at 200° C. for 5 minutes to allow a complete melting of all the crystallites. The sample was then stored for 10 days at room temperature. After 10 days the sample was subjected to DSC, it was cooled to −20° C., and then it was heated at 200° C. with a scanning speed corresponding to 10° C./min. In this heating run, the first peak temperature coming from the lower temperature side in the thermogram was taken as the melting temperature (Tm), and the area as global melting enthalpy after 10 days (ΔHf), when this was the only peak observed.

The melting temperature of crystalline form I (TmI) can also be measured in this condition when present either as a shoulder peak in the (Tm) peak or as a distinct peak at higher temperatures.

Determination of isotactic pentads content: 50 mg of each sample were dissolved in 0.5 mL of $C_2D_2Cl_4$.

The $^{13}C$ NMR spectra were acquired on a Bruker DPX-400 (100.61 Mhz, 90° pulse, 12s delay between pulses). About 3000 transients were stored for each spectrum; mmmm pentad peak (27.73 ppm) was used as reference.

The microstructure analysis was carried out as described in literature (Macromolecules 1991, 24, 2334-2340, by Asakura T. et Al. and Polymer, 1994, 35, 339, by Chujo R. et Al.).

The percentage value of pentad tacticity (mmmm %), provided in the experimental part for butene-1 homo and copolymers, is the percentage of stereoregular pentads (isotactic pentad) as calculated from the relevant pentad signals (peak areas) in the NMR region of branched methylene carbons (around 27.73 ppm assigned to the BBBBB isotactic sequence), with due consideration of the superposition between stereoirregular pentads and of those signals, falling in the same region, due to the alfa-olefin comonomer (e.g propylene derived units when present).

Molecular weight ($\overline{M}_n$, $\overline{M}_w$ and $\overline{M}_w/\overline{M}_n$): Measured by way of gel permeation chromatography (GPC) using a Waters 150-C ALC/GPC system equipped with a TSK column set (type GMHXL-HT) working at135° C. with 1,2-dichlorobenzene as solvent (ODCB) (stabilized with 0.1 vol. of 2,6-di-t-butyl p-cresole (BHT)) at flow rate of 1 ml/min. The sample is dissolved in ODCB by stirring continuously at a temperature of 140° C. for 1 hour. The solution is filtered through a 0.45 μm Teflon membrane. The filtrate (concentration 0.08-1.2 g/l injection volume 300 μl) is subjected to GPC. Monodisperse fractions of polystyrene (provided by Polymer Laboratories) were used as standard. The universal calibration for PB copolymers was performed by using a linear combination of the Mark-Houwink constants for PS (K=7.11×10-5 dl/g; a=0.743) and PB(K=1.18×10-4 dl/g; α=0.725).

Materials Used in the Examples

A polyolefin composition comprising components A) and B), hereinafter identified as "composition (A+B)", prepared by analogy with the examples of WO2007042375, is used to prepare a cross-linked polyolefin composition according to the present invention. Such composition (A+B) has a MFR of 0.6 g/10 min. and is made of (percentages by weight):

A) 30% of a copolymer of propylene with ethylene, containing 2.5% of ethylene and having MFR of 35 g/10 min. and a content of fraction soluble in xylene at room temperature of 5%;

B) 70% of a copolymer of ethylene with propylene, containing 58% of ethylene. The content of xylene-soluble fraction of composition (A+B) is of 56% by weight, and the intrinsic viscosity of such fraction is of 4 dl/g. Thus the content of xylene-soluble fraction of component B) is of 78% by weight, with an intrinsic viscosity of 4.1 dl/g.

Component C)

Butene-1/ethylene copolymer containing 8.5% by weight of ethylene, having the following properties:

Flexural modulus of 10 MPa;
Mw/Mn of 2.3;
TmII not detectable;
X-ray crystallinity of 8%;
MFR (190° C./2.16 kg) of 1 g/10 min.;
density of 0.87 g/cm³.

Such copolymer was prepared using a catalyst and a polymerization process as described in WO2009/000637.

Component D)

Ethylene copolymer containing 30% by weight of butene-1, sold by Mitsui Chemicals with the trademark Tafmer A-1050S.

Such copolymer has the following properties:

Shore A: 57;
Density: 0.86 g/cm³;
MFR: 1.2 g/10 min. (190/2.16)-2 g/10 min. (230/2.16)

Cross-Linking Additive

Peroxide: Perhexa 25B®, consisting of 2,5-dimethyl-2,5-di(t-butylperoxy)hexane (CAS No. 78-63-7) sold by NOF CORPORATION Co-agent: DVB-570®, consisting of 61-65% of divinylbenzene (CAS No. 1321-74-0), 35-39% of ethylvinylbenzene (CAS No. 28106-30-1) sold by Nippon Steel Chemical Co., ltd

EXAMPLES 1 TO 4 AND COMPARATIVE 1 AND 2

Cross-linking is carried out dynamically operating in a twin-screw extruder with a screw length/diameter ratio of 30. The polymer components and the cross-linking additive indicated in Table 1 are fed in the first blending zone. Connected to this blending zone is an area where the gas deriving from the decomposition of the peroxide are measured. Cross-linking is carried out through two consecutive blending zones.

The blending times and temperatures used in the cross-linking process of the examples range respectively from 45 to 120 seconds and from 140° C. to 220° C.

In addition to the said components, a conventional stabilizing package is added in the mixer to prevent thermal degradation and oxidation of the polyolefin composition.

TABLE 1

| Example No. | Comp.* 1 | Comp.* 2 | 1 | 2 | 3 | 4 |
|---|---|---|---|---|---|---|
| Composition (I) | | | | | | |
| (A + B) wt % | 100 | 70 | 80 | 70 | 70 | 60 |
| A) wt % | 30 | 21 | 24 | 21 | 21 | 18 |
| B) wt % | 70 | 49 | 56 | 49 | 49 | 42 |
| C) wt % | 0 | 0 | 20 | 30 | 15 | 20 |
| D) wt % | 0 | 30 | 0 | 0 | 15 | 20 |
| Cross-linking additive | | | | | | |
| Peroxide, pph** | 0.8 | 0.5 | 1 | 1 | 1 | 1 |
| Co-agent, pph** | 1 | 1 | 1 | 1 | 1 | 1 |
| MFR (g/10 min.) | 0.02 | 0.02 | 2.1 | 11.4 | 0.03 | 0.06 |
| Strand surface quality | good | Melt fracture | good | good | good | Excellent |
| Shore A*** | 88/84/83 | 77/72/70 | 83/79/78 | 82/76/74 | 82/75/74 | 79/73/71 |
| Compression set at 75° C. | 56 | 55 | 63 | 70 | 47 | 47 |

*Comparison.
**Parts by weight per 100 parts of composition (I).
***Values measured after 0, 10, 30 seconds respectively.

The invention claimed is:

1. A cross-linked composition obtained by cross-linking a polyolefin composition (I) comprising, all percentages being by weight:

A) from 5 to 38% of a polypropylene component comprising a propylene homopolymer or a propylene copolymer with at least one α-olefin comonomer, said polypropylene component containing at least 85% of propylene and having a solubility in xylene at room temperature lower than 20%;

B) from 35 to 85% of a copolymer of ethylene with propylene, containing from 42 to 70% of ethylene and having solubility in xylene at room temperature greater than 50%;

C) from 5 to 40% of a butene-1 homopolymer or copolymer having:

(i) a content of butene-1 derived units of 75% or more;
(ii) a flexural modulus of 100 MPa or less; and optionally, D) from 5 to 35% of one or more polymers different from B) in composition, having a Shore A hardness value of at most 90 points, wherein in component D) optionally comprises butene-1 and has a butene-1 content of less than 50 wt. % based upon the total weight of component D);

wherein in composition (I) the amounts of A), B), C) and D) are referred to the total weight of A)+B)+C) and optionally D), and when D) is present, the total weight of C)+D) is of 50% or less, referred to the total weight of A)+B)+C)+D).

2. The cross-linked composition of claim 1, wherein the intrinsic viscosity [η] of the fraction soluble in xylene at room temperature of component B) of the polyolefin composition (I) is at least 3 dl/g.

3. The cross-linked composition of claim 1, wherein component C) of the polyolefin composition (I) has a density of 0.899 g/cm$^3$.

4. The cross-linked composition of claim 1, wherein component D) of the polyolefin composition (I) is selected from the following polymer materials or a combination thereof:
   i) ethylene copolymers containing up to 45% by weight of at least one α-olefin comonomer; and
   ii) propylene copolymers containing up to 40% by weight of at least one α-olefin comonomer.

5. The cross-linked polyolefin composition of claim 1, obtained by blending the polyolefin composition (I) with a cross-linking additive and heating the thus obtained blend at a temperature above the melting temperature of component A).

6. The cross-linked polyolefin composition of claim 5, obtained by using a cross-linking additive comprising a free radical initiator and a cross-linking co-agent.

7. The cross-linked polyolefin composition of claim 6, obtained by using a cross-linking additive wherein the free radical initiator is an organic peroxide and the cross-linking co-agent is selected from divinylbenzene, ethylvinylbenzene, triallyl cyanurate, tryallyl isocyanurate, 1,2-polybutadiene, acrylates, methacrylates or furan derivatives.

8. A polyolefin composition comprising, all percentages being by weight:
   A) from 5 to 38% of a polypropylene component comprising a propylene homopolymer or a propylene copolymer with at least one α-olefin comonomer, said polypropylene component containing at least 85% of propylene and having a solubility in xylene at room temperature lower than 20%;
   B) from 35 to 85% of a copolymer of ethylene with propylene, containing from 42 to 70% of ethylene and having solubility in xylene at room temperature greater than 50%;
   C) from 5 to 40% of a butene-1 homopolymer or copolymer having:
      (i) a content of butene-1 derived units of at least 75%;
      (ii) a flexural modulus of at most 100 MPa; and
   D) from 5 to 35% of one or more polymers different from B) in composition, having a Shore A hardness value of at most 90 points, wherein in component D) optionally comprises butene-1 and has a butene-1 content of less than 50 wt. % based upon the total weight of component D);
   in which composition the amounts of A), B), C) and D) are referred to the total weight of A)+B)+C) and D), and the total weight of C)+D) is of 50% or less, referred to the total weight of A)+B)+C)+D).

9. A manufactured article comprising:
a cross-linked composition obtained by cross-linking a polyolefin composition (I) comprising, all percentages being by weight:
A) from 5 to 38% of a polypropylene component comprising a propylene homopolymer or a propylene copolymer with at least one α-olefin comonomer, said polypropylene component containing at least 85% of propylene and having a solubility in xylene at room temperature lower than 20%;
B) from 35 to 85% of a copolymer of ethylene with propylene, containing from 42 to 70% of ethylene and having solubility in xylene at room temperature greater than 50%;
C) from 5 to 40% of a butene-1 homopolymer or copolymer having:
   (i) a content of butene-1 derived units of 75% or more;
   (ii) a flexural modulus of 100 MPa or less; and optionally,
D) from 5 to 35% of one or more polymers different from B) in composition, having a Shore A hardness value of at most 90 points, wherein in component D) optionally comprises butene-1 and has a butene-1 content of less than 50 wt. % based upon the total weight of component D);
wherein in composition (I) the amounts of A), B), C) and D) are referred to the total weight of A)+B)+C) and optionally D), and when D) is present, the total weight of C)+D) is of 50% or less, referred to the total weight of A)+B)+C)+D).

10. The cross-linked composition of claim 3 wherein component C) has a density of at most 0.895 g/cm$^3$.

11. The cross-linked polyolefin composition of claim 5, wherein the blend is heated at a temperature from 160 to 250° C.

* * * * *